United States Patent [19]
Ohlhausen

[11] 3,756,200
[45] Sept. 4, 1973

[54] TICK ERADICATOR

[76] Inventor: William T. Ohlhausen, 8037 Downe Dr., Ft. Worth, Tex. 76108

[22] Filed: Aug. 21, 1972

[21] Appl. No.: 282,466

[52] U.S. Cl. ............................................. 119/156
[51] Int. Cl. ..................... A01k 13/00, A01k 29/00
[58] Field of Search ........................... 119/156, 106; 128/329, 330; 40/301, 302

[56] References Cited
UNITED STATES PATENTS
3,405,688 10/1968 Gerhardi ............................ 119/156
3,687,114 8/1972 Berkstresser ........................ 119/106

*Primary Examiner*—Hugh R. Chamblee
*Attorney*—J. Bruce Synnott, Jr.

[57] ABSTRACT

A device for attachment to a cow's ear to repel ticks. Comprises a short length of molded plastic strip material, receivable bodily in the ear, having an insect repellant material incorporated in the composition thereof as its active ingredient, and means for attachment of the strip material to the ear. The strip material in its operative position is attached to a peripheral portion of the ear and extends deep into the pocket thereof.

1 Claim, 5 Drawing Figures

PATENTED SEP 4 1973 3,756,200
Fig. 1
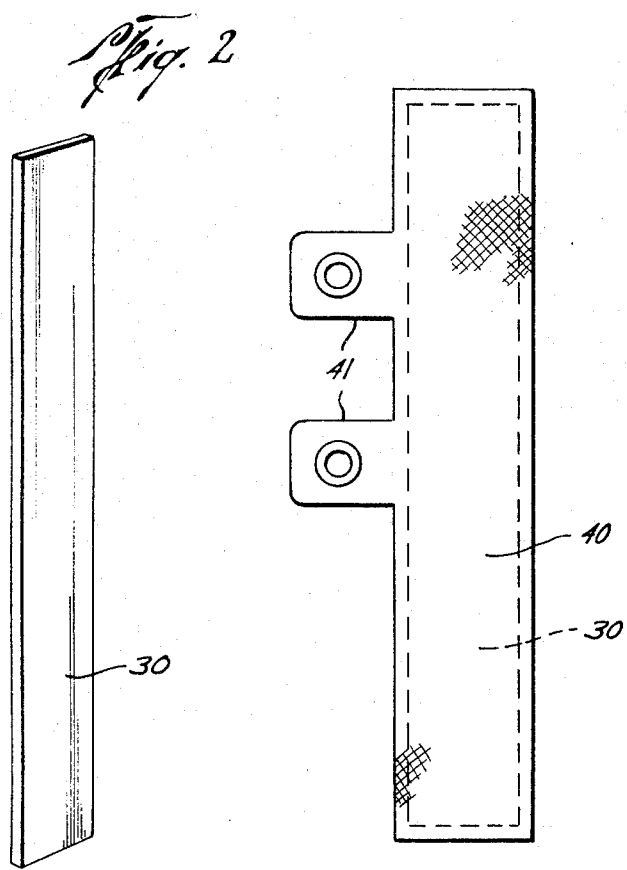
Fig. 2
Fig. 3
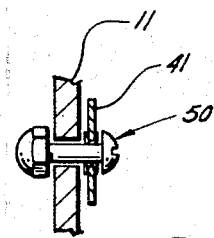
Fig. 4
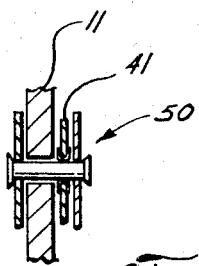
Fig. 5

TICK ERADICATOR

This invention relates to a TICK ERADICATOR, and it concerns more particularly a device for attachment to a cow's ear to repel ticks.

The device of the invention comprises a short length of molded plastic strip material receivable bodily in the ear, having an insect repellant material incorporated in the composition thereof as its active ingredient, and means for attachment of the strip material to the ear. The strip material in its operative position is attached to a peripheral portion of the ear and extends deep into the pocket thereof.

In one form thereof the means for attachment of the strip material to the ear includes a non-fluid tight envelope, open to the atmosphere, having the strip material received bodily therein, in loosely fitting relation thereto, the envelope having one or more integral tabs extending laterally outwardly from one of its longitudinal edges, and fastening means, engageable with aligned holes therefor in the tab or tabs, and in the ear, arranged to secure the envelope to the ear in loosely fitting relation thereto, without binding or applying pressure to the ear.

The invention will be readily understood by referring to the following description and the accompanying drawing, in which:

FIG. 1 shows a device embodying the invention in its operative position, attached to a cow's ear.

FIG. 2 shows a length of molded plastic strip material as hereinafter described.

FIG. 3 shows the device of the invention separately, on an enlarged scale, showing the non-fluid tight envelope, open to the atmosphere, which has a short length of molded plastic strip material, shown in broken lines, received bodily therein, in loosely fitting relation thereto. As shown the envelope has a pair of integral tabs extending laterally outwardly from one of its longitudinal edges.

FIGS. 4 and 5 are exploded views showing specific examples of fastening means suitable for use in carrying out the invention, in which the fastening means is engageable with aligned holes therefor in the tabs, and in the ear, whereby the envelope may be secured to the ear in loosely fitting relation thereto, without binding or applying pressure to the ear.

Referring to FIG. 1 of the drawing, the numeral 10 designates generally the head of a cow having an ear, indicated generally by the numeral 11. A device embodying the invention, indicated generally by the numeral 20, is received bodily in the ear 11. The device 20 is attached to a peripheral portion of the ear 11 and extends deep into the pocket thereof.

The invention includes a short length of molded plastic strip material 30, shown in broken lines in FIG. 3, which is receivable bodily in the ear 11, as illustrated in FIG. 1, and which has an insect repellant material incorporated in the composition thereof as its active ingredient, and means as hereinafter described for attachment of the strip material 30 to the ear 11.

The molded plastic strip material 30 advantageously may coincide with the material of the well known HARTZ 90 Day Brand Clear Collar For Dogs. SERGEANT'S markets a similar product, which is useful also for cats, to "kill" fleas and also to "control" ticks.

Applicant has not seen any dead fleas or ticks resulting from use of such molded plastic strip material, either as a "flea collar" for dogs or in the manner contemplated by this invention.

The composition of the molded plastic strip material is understood to be as follows:

| Active ingredients: | |
|---|---|
| 2,2-Dichlorovinyl dimethyl phosphate | 8.37% |
| Related compounds | 0.63% |
| Inert ingredients | 91.00% |
| Total: | 100.00% |

The molded plastic strip material above mentioned is said to be described in the following U.S. Pat:

No. 2,956,073

No. 3,116,201

No. 3,318,769

(EPA Reg. No. 2724-172)

The means for attachment of the strip material 30 to the ear 11 includes a non-fluid tight envelope 40, open to the atmosphere, which has the strip material 30 received bodily therein, in loosely fitting relation thereto, as shown in broken lines in FIG. 3.

The material of the non-fluid tight envelope 40 advantageously may be a loosely woven, porous fabric or cloth. A cloth made of synthetic fibers such as DACRON, for example, and which resists weather, mildew, and rot, is suitable, although the invention is not necessarily limited to use of any one material.

The envelope 40 has a pair of integral tabs 41 which extend laterally outwardly from one of its longitudinal edges, and the invention further includes fastening means as hereinafter described, examples of which are illustrated in FIGS. 4 and 5, all indicated generally by the numeral 50, engageable with aligned holes therefor in the tabs 41, and in the ear 11, whereby the envelope 40 may be secured to the ear 11 in loosely fitting relation thereto, without binding or applying pressure pressure to the ear 11.

As shown in FIG. 4 the fastening means 50 consists of a bolt and a nut therefor, the bolt being threaded on one end only. As illustrated in FIG. 5 the fastening means 50 consists of a tubular rivet and a pair of washers therefor, the rivet being characterized by its length.

I claim:

1. A device for attachment to a cow's ear to repel ticks comprising a short length of molded plastic strip material, receivable bodily in the ear, having an insect repellant material incorporated in the composition thereof as its active ingredient, and means for attachment of the strip material to the ear, the strip material in its operative position being attached to a peripheral portion of the ear and extending deep into the pocket thereof, the means for attachment of the strip material to the ear including a non-fluid tight envelope, open to the atmosphere, having the strip material received bodily therein, in loosely fitting relation thereto, the envelope having one or more integral tabs extending laterally outwardly from one of its longitudinal edges, and fastening means, engageable with aligned holes therefor in the tab or tabs, and in the ear, arranged to secure the envelope to the ear in loosely fitting relation thereto, without binding or applying pressure to the ear.

* * * * *